United States Patent
Yang

(10) Patent No.: US 11,836,836 B2
(45) Date of Patent: Dec. 5, 2023

(54) METHODS AND APPARATUSES FOR GENERATING MODEL AND GENERATING 3D ANIMATION, DEVICES AND STORAGE MEDIUMS

(71) Applicant: Beijing Baidu Netcom Science Technology Co., Ltd., Beijing (CN)

(72) Inventor: Shaoxiong Yang, Beijing (CN)

(73) Assignee: Beijing Baidu Netcom Science Technology Co., Ltd., Beijing (CN)

( * ) Notice: Subject to any disclaimer, the term of this patent is extended or adjusted under 35 U.S.C. 154(b) by 129 days.

(21) Appl. No.: 17/527,068

(22) Filed: Nov. 15, 2021

(65) Prior Publication Data

US 2022/0076470 A1    Mar. 10, 2022

(30) Foreign Application Priority Data

Dec. 16, 2020    (CN) .......................... 202011485571.0

(51) Int. Cl.
| | | |
|---|---|---|
| *G06T 13/20* | (2011.01) | |
| *G06T 17/20* | (2006.01) | |
| *G06N 3/04* | (2023.01) | |
| *G06N 3/08* | (2023.01) | |
| *G06N 3/045* | (2023.01) | |

(52) U.S. Cl.
CPC ............. *G06T 13/20* (2013.01); *G06N 3/045* (2023.01); *G06N 3/08* (2013.01); *G06T 17/20* (2013.01)

(58) Field of Classification Search
CPC ......... G06T 13/20; G06T 17/20; G06N 3/045; G06N 3/08
See application file for complete search history.

(56) References Cited

U.S. PATENT DOCUMENTS

| | | | |
|---|---|---|---|
| 2007/0233321 | A1 | 10/2007 | Suzuki |
| 2020/0234690 | A1* | 7/2020 | Savchenkov ........... G06T 13/40 |
| 2020/0302667 | A1* | 9/2020 | del Val Santos ....... G06N 3/084 |

FOREIGN PATENT DOCUMENTS

| | | |
|---|---|---|
| CN | 110210429 A | 9/2019 |
| CN | 111370020 A | 7/2020 |
| CN | 111986295 A | 11/2020 |

* cited by examiner

*Primary Examiner* — Michelle Chin
(74) *Attorney, Agent, or Firm* — Kilpatrick Townsend & Stockton LLP

(57) ABSTRACT

Methods and apparatuses for generating a model and generating a 3D animation, devices, and storage mediums are provided. The method for generating a model may include: acquiring a preset sample set; acquiring pre-established generative adversarial nets, the generative adversarial nets including a generator and a discriminator; and performing training steps as follows: selecting a sample from the sample set; extracting a sample audio feature from the sample audio of the sample; inputting the sample audio feature into the generator to obtain a pseudo 3D mesh vertex sequence of the sample; inputting the pseudo 3D mesh vertex sequence and the real 3D mesh vertex sequence of the sample into the discriminator to discriminate authenticity of 3D mesh vertices; and in response to determining that the generative adversarial nets meet a training completion condition, obtaining a trained generator as a model for generating a 3D animation.

16 Claims, 5 Drawing Sheets

METHODS AND APPARATUSES FOR GENERATING MODEL AND GENERATING 3D ANIMATION, DEVICES AND STORAGE MEDIUMS

CROSS-REFERENCE TO RELATED APPLICATIONS

This application claims priority to Chinese Application No. 202011485571.0, filed on Dec. 16, 2020 and entitled "Methods and Apparatuses for Generating Model and Generating 3D Animation, Devices and Storage Mediums," the content of which is hereby incorporated by reference in its entirety.

TECHNICAL FIELD

Embodiments of the present disclosure relate to the field of artificial intelligence technology, specifically to the fields of computer vision, augmented reality, and deep learning technology.

BACKGROUND

After exploration and development in recent years, computer vision has been applied in application scenarios in many fields such as digital entertainment, medical health, and security monitoring. Synthesizing vivid visual content not only has great commercial value, but is also what the industry has always expected. Without comprehensive visual effects synthesized by the computer, many movie effects are impossible. At present, there are already a large number of artificially synthesized videos on the Internet. In addition, speech recognition and text-to-speech synthesis technology have also been widely used in chat robots. The existing deep learning-based method generates a talking video of the entire face from a single image. The method is sufficient to obtain a shape of lips that well matches a provided speech, but a generated facial expression has obvious jitter between frames, and the generated facial expression is relatively unreal, and an audio is not very synchronized with the expression (seems very contradictory).

SUMMARY

Embodiments of the present disclosure provide methods and apparatuses for generating a model and generating a 3D animation, devices and storage mediums.

In a first aspect, an embodiment of the present disclosure provides a method for generating a model, the method including: acquiring a preset sample set, the sample set comprising at least one sample, and each of the at least one sample comprising a sample audio and a real 3D mesh vertex sequence; acquiring pre-established generative adversarial nets, the generative adversarial nets comprising a generator and a discriminator; and performing training steps as follows: selecting a sample from the sample set; extracting a sample audio feature from the sample audio of the sample; inputting the sample audio feature into the generator to obtain a pseudo 3D mesh vertex sequence of the sample; inputting the pseudo 3D mesh vertex sequence and the real 3D mesh vertex sequence of the sample into the discriminator to discriminate authenticity of 3D mesh vertices; and in response to determining that the generative adversarial nets meet a training completion condition, obtaining a trained generator as a model for generating a 3D animation.

In a second aspect, an embodiment of the present disclosure provides a method for generating a 3D animation, the method including: extracting an audio feature from an audio; inputting the audio feature into a generator of generative adversarial nets generated in the method according to any embodiment of the first aspect, to generate a 3D mesh vertex sequence; and rendering the 3D mesh vertex sequence to obtain a 3D animation.

In a third aspect, an embodiment of the present disclosure provides an apparatus for generating a model, the apparatus including: a sample acquisition unit, configured to acquire a preset sample set, the sample set comprising at least one sample, and each of the at least one sample comprising a sample audio and a real 3D mesh vertex sequence; a network acquisition unit, configured to acquire pre-established generative adversarial nets, the generative adversarial nets comprising a generator and a discriminator; a selection unit, configured to select a sample from the sample set; an extraction unit, configured to extract a sample audio feature from the sample audio of the sample; a generation unit, configured to input the sample audio feature into the generator to obtain a pseudo 3D mesh vertex sequence of the sample; a discrimination unit, configured to input the pseudo 3D mesh vertex sequence and the real 3D mesh vertex sequence of the sample into the discriminator to discriminate authenticity of 3D mesh vertices; and an output unit, configured to, in response to determining that the generative adversarial nets meet a training completion condition, obtain a trained generator as a model for generating a 3D animation.

In a fourth aspect, an embodiment of the present disclosure provides an apparatus for generating a 3D animation, the apparatus including: a feature extraction unit, configured to extract an audio feature from an audio; a sequence generation unit, configured to input the audio feature into a generator of generative adversarial nets generated in the method according to any embodiment of the first aspect, to generate a 3D mesh vertex sequence; and an animation generation unit, configured to render the 3D mesh vertex sequence to obtain a 3D animation.

In a fifth aspect, an embodiment of the present disclosure provides an electronic device, the device electronic including: at least one processor; and a memory, communicatively connected with the at least one processor; the memory storing instructions executable by the at least one processor, and the instructions, when executed by the at least one processor, causing the at least one processor to perform the method according to any embodiment of the first aspect.

In a sixth aspect, an embodiment of the present disclosure provides anon-transitory computer readable storage medium, storing computer instructions, the computer instructions being used to cause a computer to perform the method according to any embodiment of the first aspect.

In a seventh aspect, an embodiment of the present disclosure provides a computer program product, including instructions, the instructions, when executed by a processor, performing the method for generating a model according to any embodiment of the first aspect or performing the method for generating a 3D animation according to any embodiment of the second aspect.

It should be understood that the content described in this section is not intended to identify key or important features of embodiments of the present disclosure, nor is it intended to limit the scope of embodiments of the present disclosure.

Other features of embodiments of the present disclosure may be easily understood by the following description.

BRIEF DESCRIPTION OF THE DRAWINGS

The accompanying drawings are used to better understand the present solution, and do not constitute a limitation to embodiments of the present disclosure.

DETAILED DESCRIPTION OF EMBODIMENTS

Example embodiments of the present disclosure are described below in combination with the accompanying drawings, and various details of embodiments of the present disclosure are included in the description to facilitate understanding, and should be considered as illustrative only. Accordingly, it should be recognized by one of the ordinary skilled in the art that various changes and modifications may be made to embodiments described herein without departing from the scope and spirit of the present disclosure. Also, for clarity and conciseness, descriptions for well-known functions and structures are omitted in the following description.

According to the technology of embodiments of the present disclosure, there is no need to make additional modifications to the generator, nor to increase the number of generator parameters and calculation amount, and predicted time consuming may not increase, but the authenticity, continuity, stability and synchronization of facial expressions greatly improve. The technology of embodiments of the present disclosure strongly supports a variety of business and product scenarios such as audio stream-driven virtual avatar live broadcast and video production, and has very high application value.

Figure 1:
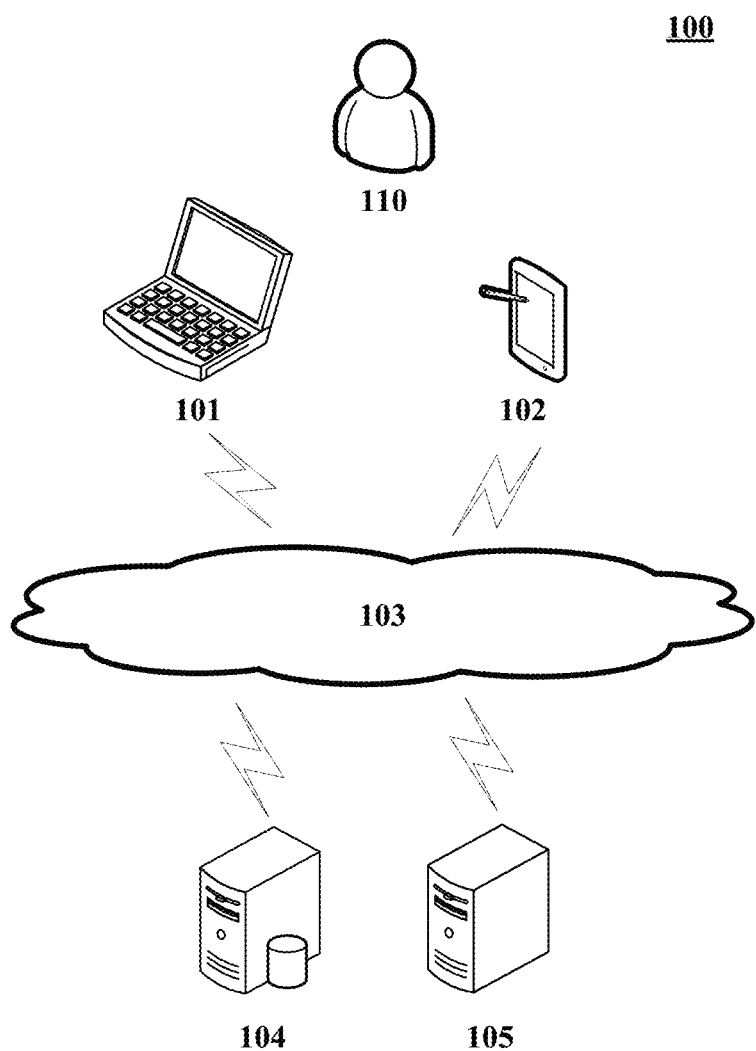
FIG. 1 is a diagram of an example system architecture in which embodiments of the present disclosure may be implemented.

FIG. 1 shows an example system architecture 100 of a method for generating a model, an apparatus for generating a model, a method for generating a 3D animation, or an apparatus for generating a 3D animation to which embodiments of the present disclosure may be applied.

As shown in FIG. 1, the system architecture 100 may include terminals 101 and 102, a network 103, a database server 104, and a server 105. The network 103 serves as a medium for providing a communication link between the terminals 101 and 102, the database server 104 and the server 105. The network 103 may include various types of connections, such as wired or wireless communication links, or optical fibers.

A user 110 may use the terminals 101 and 102 to interact with the server 105 through the network 103 to receive or send messages and so on. Various client applications may be installed on the terminals 101 and 102, such as model training applications, audio-driven face animation applications, shopping applications, payment applications, web browsers, and instant messaging tools.

The terminals 101 and 102 may be hardware or software. When the terminals 101 and 102 are hardware, the terminals 101 and 102 may be various electronic devices having display screens, including but not limited to smart phones, tablet computers, e-book readers, MP3 players (Moving Picture Experts Group Audio Layer III), laptop portable computers and desktop computers, etc. When the terminals 101 and 102 are software, the terminals 101 and 102 may be installed in the electronic devices listed above. The terminals 101 and 102 may be implemented as a plurality of pieces of software or software modules (for example, for providing distributed services), or as a single piece of software or software module, which is not limited herein.

When the terminals 101 and 102 are hardware, the terminals 101 and 102 may also be installed with microphones, image acquisition devices. The image acquisition devices may be various devices that may realize the function of image acquisition, such as cameras, or sensors. The user 110 may use the image acquisition devices on the terminals 101 and 102 to acquire faces, and use the microphones to acquire voices.

The database server 104 may be a database server that provides various services. For example, a sample set may be stored in the database server. The sample set contains a large number of samples. Each of the samples may include a sample audio and a real 3D mesh vertex sequence. In this regard, the user 110 may also select a sample from the sample set stored in the database server 104 using the terminals 101 and 102.

The server 105 may also be a server that provides various services, for example, a backend server that provides support for various applications running on the terminals 101 and 102. The backend server may use samples in the sample set sent by the terminals 101 and 102 to train an initial model, and may send a training result (such as a generated model) to the terminals 101 and 102. In this regard, the user may apply the generated model for 3D animation drive.

The database server 104 and the server 105 here may also be hardware or software. When the database server 104 and the server 105 are hardware, the database server 104 and the server 105 may be implemented as a distributed server cluster composed of a plurality of servers, or as a single server. When the database server 104 and the server 105 are software, the database server 104 and the server 105 may be implemented as a plurality of pieces of software or software modules (for example, for providing distributed services), or as a single piece of software or software module, which is not limited herein.

It should be noted that the method for generating a model and the method for generating a 3D animation provided in embodiments of the present disclosure are generally performed by the server 105. Correspondingly, the apparatus for generating a model and the apparatus for generating a 3D animation are generally also provided in the server 105.

It should be noted that when the server 105 may realize related functions of the database server 104, the database server 104 may not be provided in the system architecture 100.

It should be understood that the numbers of terminals, networks, database servers and servers in FIG. 1 are merely illustrative. Depending on the implementation needs, there may be any number of terminals, networks, database servers and servers.

Figure 2:
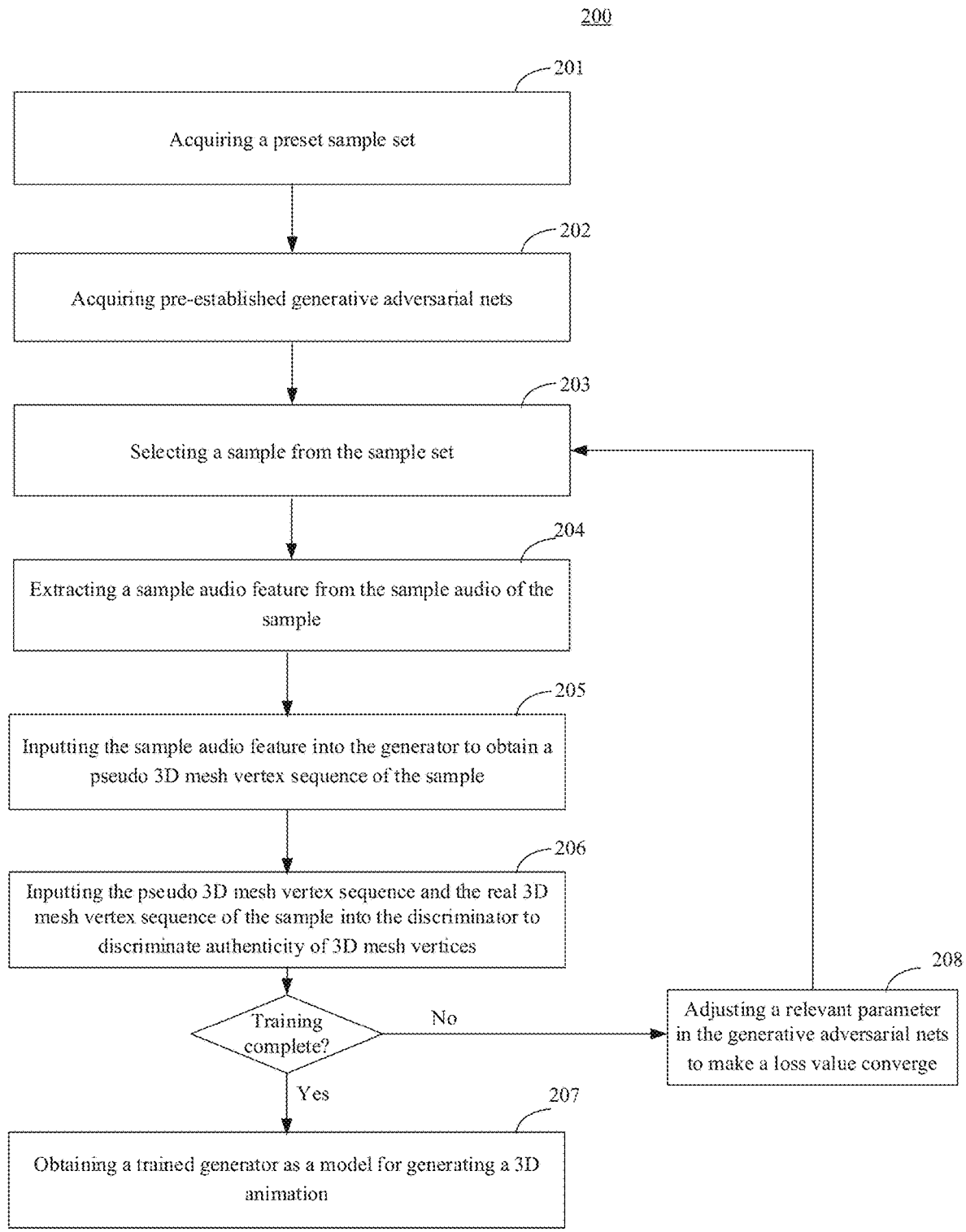
FIG. 2 is a flowchart of a method for generating a model according to an embodiment of the present disclosure.

With further reference to FIG. 2, illustrating a flow 200 of a method for generating a model according to an embodiment of the present disclosure. The method for generating a model may include following steps.

Step 201, acquiring a preset sample set.

In the present embodiment, an executing body of the method for generating a model (for example, the server shown in FIG. 1) may acquire the sample set in a variety of methods. For example, the executing body may acquire an existing sample set stored in a database server (for example, the database server 104 shown in FIG. 1) through a wired connection or a wireless connection. For example, a user may collect samples using a terminal (for example, the terminals 101 and 102 shown in FIG. 1). In this regard, the executing body may receive the samples collected by the terminal and store these samples locally, thereby generating the sample set.

Here, the sample set may include at least one sample. Each of the at least one sample may include a sample audio and a real 3D mesh vertex (3D mesh) sequence. Each image frame corresponds to a 3D mesh vertex frame, the sample marks a position of each 3D mesh vertex, and consecutive frames of images correspond to a 3D mesh vertex sequence, that is, a real 3D mesh vertex sequence.

Step 202, acquiring pre-established generative adversarial nets.

In the present embodiment, the generative adversarial nets (GAN) includes a generator and a discriminator. The generator is used to convert an audio feature into a 3D mesh vertex sequence, and the discriminator is used to determine whether an input 3D mesh vertex sequence is forged by the generator.

It should be noted that the generator may be a convolutional neural network (for example, various convolutional neural network structures including a convolution layer, a pooling layer, a de-pooling layer, and a deconvolution layer, which may perform down-sampling and up-sampling sequentially); the discriminator may also be a convolutional neural network (for example, various convolutional neural network structures including a fully connected layer, where the fully connected layer may realize a classification function). In addition, the discriminator may also be other model structures that may be used to realize the classification function, such as a support vector machine (SVM).

Step 203, selecting a sample from the sample set.

In the present embodiment, the executing body may select the sample from the sample set acquired in step 201, and perform training steps from step 203 to step 208. A selection method of the sample and the number of samples selected are not limited in the present disclosure. For example, at least one sample may be randomly selected, or a sample having a longer audio may be selected. Each sample may be a pair of a sample audio and a real 3D mesh vertex sequence. The real 3D mesh vertex sequence is position information of several frames of real 3D mesh vertices, and each real 3D mesh vertex frame marks a real position of each 3D mesh vertex in a face image.

Step 204, extracting a sample audio feature from the sample audio of the sample.

In the present embodiment, the sample audio feature may be extracted from the sample audio of the sample through a recurrent neural network (RNN), for example, a network structure such as DeepSpeech.

Step 205, inputting the sample audio feature of the sample into the generator to obtain a pseudo 3D mesh vertex sequence of the sample.

In the present embodiment, the generator may convert an inputted audio into a pseudo 3D mesh vertex sequence. For example, the audio "ah" is inputted into the generator and converted into a 3D mesh vertex sequence of a face with an open mouth. Not only positions of 3D mesh vertices of the mouth change, but 3D mesh vertices of the entire face may change.

Step 206, inputting the pseudo 3D mesh vertex sequence and the real 3D mesh vertex sequence of the sample into the discriminator to discriminate authenticity of 3D mesh vertices.

In the present embodiment, in response to determining that the discriminator discriminates that the inputted pseudo 3D mesh vertex sequence is the 3D mesh vertex sequence outputted by the above generator, the discriminator may output 1; or in response to determining that the discriminator discriminates that the inputted pseudo 3D mesh vertex sequence is not the 3D mesh vertex sequence outputted by the above generator, the discriminator may output 0. The discriminator also discriminates the real 3D mesh vertex sequence. In response to determining that the discriminator discriminates that the inputted real 3D mesh vertex sequence is the 3D mesh vertex sequence outputted by the above generator, the discriminator may output 0; or in response to determining that the discriminator discriminates that the inputted real 3D mesh vertex sequence is not the 3D mesh vertex sequence outputted by the above generator, the discriminator may output 1. It should be noted that the discriminator may also output other values based on preset settings, not limited to 1 and 0.

Step 207, obtaining a trained generator as a model for generating a 3D animation, in response to determining that the generative adversarial nets meet a training completion condition.

In the present embodiment, the training completion condition includes at least one of: the number of training iterations reaches a predetermined iteration threshold, a loss value is less than a predetermined loss value threshold, or a discrimination accuracy of the discriminator is within a predetermined range. For example, the number of training iteration reaches 5,000 times. The loss value is less than 0.05. The discrimination accuracy of the discriminator reaches 50%. After the training is completed, only the generator is retained as the model for generating a 3D animation. Setting the training completion condition may speed up model convergence rate.

Step 208, adjusting a relevant parameter in the generative adversarial nets to make a loss value converge, in response to determining that the generative adversarial nets do not meet the training completion condition, and continue performing the training steps 203-208 based on the adjusted generative adversarial nets.

In the present embodiment, in response to determining that the training is not completed, a parameter of the generator or a parameter of the discriminator is adjusted to make the loss value converge. The parameter of the discriminator may be kept unchanged first, and step 203 to step 208 are performed repeatedly to adjust the parameter of the corresponding generator to make the loss value gradually decrease until stabilized. Then, the parameter of the generator is kept unchanged, and step 203 to step 208 are performed repeatedly to adjust the parameter of the discriminator to make the loss value gradually increase until stabilized. The parameters of the generator and the discriminator are alternately trained until the loss value converges.

The above generator and the discriminator are trained, and the trained generator is determined as the model for generating a 3D animation. Specifically, the parameter of any network (which may be referred to as a first network) of the generator and the discriminator may be fixed first, and a network with not fixed parameter (which may be referred to as a second network) may be optimized; and then the parameter of the second network may be fixed to improve the first network. The above iteration is continuously performed, so that the discriminator cannot distinguish whether the inputted 3D mesh vertex sequence is generated by the generator, until it finally converges. Then, the pseudo 3D mesh vertex sequence generated by the generator is close to the real 3D mesh vertex sequence, and the discriminator cannot accurately distinguish between real data and generated data (that is, accuracy rate being 50%). Then the generator may be determined as an audio-driven facial expression animation model.

For example, the training steps may be performed as follows: a first step, fixing the parameter of the generator, using the sample audio feature as an input of the generator, and using the pseudo 3D mesh vertex sequence outputted by the generator and the real 3D mesh vertex sequence as an input of the discriminator, training the discriminator using a machine learning method. It should be noted that since the pseudo 3D mesh vertex sequence outputted by the generator is all generated data, and the real 3D mesh vertex sequence is known to be real data, for the pseudo 3D mesh vertex sequence inputted into the discriminator, a label for indicating that the pseudo 3D mesh vertex sequence is the generated data or real data may be automatically generated; a second step, fixing the parameter of the trained discriminator, using the sample audio feature as the input of the generator, and training the generator using the machine learning method, a back propagation algorithm and a gradient descent algorithm. In practice, the back propagation algorithm and the gradient descent algorithm are well-known technologies that are currently widely studied and applied, and detailed description thereof will be omitted; and a third step, counting an accuracy of a discriminant result outputted by the discriminator after the training, in response to determining that the accuracy is a preset value (for example, 50%), and determining the generator as the above audio-driven facial expression animation model.

It should be noted that, in response to determining that the accuracy is not the preset value, the electronic device may use the trained generator and the trained discriminator to perform the above training steps again. Therefore, the parameter of the model for generating a 3D animation obtained by training by the generative adversarial nets is not only obtained based on training samples, but also may be determined based on back propagation of the discriminator. The training of the model may be realized without relying on a large number of labeled samples to obtain the model for generating a 3D animation, which reduces labor costs and further improves the flexibility of audio-driven 3D animation processing.

The method provided by the foregoing embodiment of the present disclosure can quickly and accurately train the model for generating a 3D animation, and improve vividness of 3D animations generated by the model.

In some alternative implementations of the present embodiment, the discriminator includes at least one of: a 3D mesh vertex frame discriminator, an audio and 3D mesh vertex sequence synchronization discriminator, or a 3D mesh vertex sequence discriminator. The discriminator may be one or three of the above three types, or any combination of two types. Thus, the generator may be improved with different effects. For example, the 3D mesh vertex frame discriminator, the audio and 3D mesh vertex sequence synchronization discriminator may make the generated model generate more realistic animations, and audios and expressions are synchronized.

In some alternative implementations of the present embodiment, in response to determining that the discriminator includes the 3D mesh vertex frame discriminator, the inputting the pseudo 3D mesh vertex sequence and the real 3D mesh vertex sequence of the sample into the discriminator to discriminate authenticity of 3D mesh vertices, includes: inputting each 3D mesh vertex frame in the pseudo 3D mesh vertex sequence and each 3D mesh vertex frame in the real 3D mesh vertex sequence into the 3D mesh vertex frame discriminator to discriminate authenticity of a single 3D mesh vertex frame. The pseudo 3D mesh vertex sequence includes at least one pseudo 3D mesh vertex frame, the real 3D mesh vertex sequence includes at least one real 3D mesh vertex frame, and a single pseudo 3D mesh vertex frame and a single real 3D mesh vertex frame are inputted into the 3D mesh vertex frame discriminator to discriminate the authenticity of the single 3D mesh vertex frame. A training method of the 3D mesh vertex frame discriminator is the same as in the steps 203-208, and detailed description thereof will be omitted. This implementation may improve the accuracy of generating a 3D mesh vertex of a face, and make facial expression animations look more real.

In some alternative implementations of the present embodiment, in response to determining that the discriminator includes the audio and 3D mesh vertex sequence synchronization discriminator, the inputting the pseudo 3D mesh vertex sequence and the real 3D mesh vertex sequence of the sample into the discriminator to discriminate authenticity of 3D mesh vertices, includes: forming a first matrix by splicing the pseudo 3D mesh vertex sequence and the sample audio; forming a second matrix by splicing the real 3D mesh vertex sequence and the sample audio; and inputting the first matrix and the second matrix into the audio and 3D mesh vertex sequence synchronization discriminator to discriminate whether the audio and the 3D mesh vertex sequences are synchronized. The sample audio may be represented by a vector, and the pseudo 3D mesh vertex sequence outputted by the generator is also represented by a vector. These two vectors may be spliced into a matrix. Similarly, the real 3D mesh vertex sequence and the sample audio may be spliced into a matrix. Two different data sources are represented by naming the "first matrix" and the "second matrix". The audio and 3D mesh vertex sequence synchronization discriminator is used to determine whether the outputted matrices are synchronized. A purpose of training is that the audio and 3D mesh vertex sequence synchronization discriminator determines an accuracy of whether the first matrix is synchronized is 50%, and determines an accuracy of whether the second matrix is synchronized is 50%. This implementation may reduce jitter of generated facial expressions.

In some alternative implementations of the present embodiment, in response to determining that the discriminator includes the 3D mesh vertex sequence discriminator, the inputting the pseudo 3D mesh vertex sequence and the real 3D mesh vertex sequence of the sample into the discriminator to discriminate authenticity of 3D mesh vertices, includes: inputting the pseudo 3D mesh vertex sequence and the real 3D mesh vertex sequence into the 3D mesh vertex sequence discriminator to discriminate authenticity of the 3D mesh vertex sequences. A difference between the 3D mesh vertex sequence discriminator and the 3D mesh vertex frame discriminator is that the 3D mesh vertex sequence discriminator is used to discriminate the authenticity of an entire 3D mesh vertex sequence, while the 3D mesh vertex frame discriminator only discriminates the authenticity of a single frame of 3D mesh vertex sequence. This implementation may synchronize audios and generated facial expression animations.

In some alternative implementations of the present embodiment, the generator may include an audio encoding module and an expression decoding module.

A structure of the audio encoding module may include 4 convolutional layers and 2 fully connected layers. The numbers of convolutional kernels in the 4 convolutional layers are 32, 32, 64, 64 in sequence, and the numbers of neurons in the 2 fully connected layers are 128, 100 in sequence.

A structure of the expression decoding module: the expression decoding module may include 1 fully connected layer, a total of 5023*3=15069 neurons, and an output of 5023 vertex coordinates (5023*3 dimensions).

The principle is as follows.

The audio encoding module completes audio feature encoding to a 100-dimensional vector, and then recovers 3D mesh (vertices) from the 100-dimensional vector using a decoder. 100-dimensional hidden layer vector may be understood as some control parameters representing a 3D face mesh structure. This method is convenient to quickly and accurately generate 3D mesh vertices.

Figure 3:
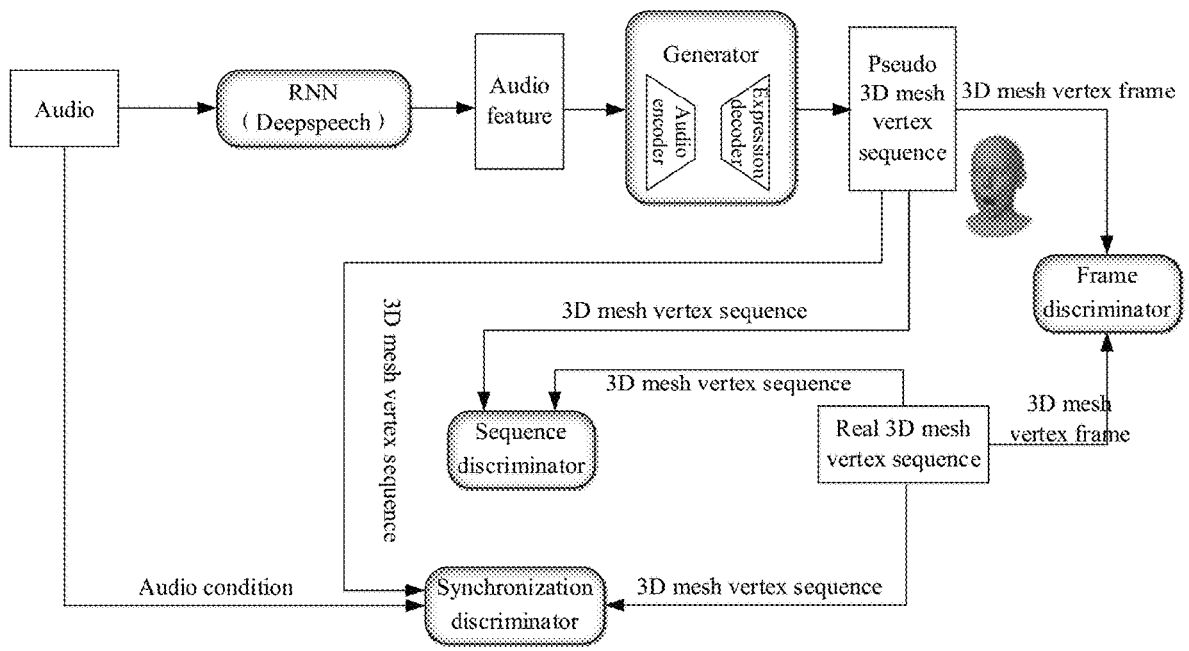
FIG. 3 is a schematic diagram of an application scenario of the method for generating a model according to an embodiment of the present disclosure.

With further reference to FIG. 3, FIG. 3 is a schematic diagram of an application scenario of the method for generating a model according to the present embodiment. In the application scenario of FIG. 3, an audio is inputted into RNN to obtain an audio feature. Then, the audio feature is inputted into a generator to obtain a pseudo 3D mesh vertex sequence. Then, the pseudo 3D mesh vertex sequence is inputted into an audio and 3D mesh vertex sequence synchronization discriminator (referred to as the synchronization discriminator) and a 3D mesh vertex sequence discriminator (referred to as the sequence discriminator) respectively, and a real 3D mesh vertex sequence in a sample is also inputted into the audio and 3D mesh vertex sequence synchronization discriminator and the 3D mesh vertex sequence discriminator respectively. An audio condition also needs to be inputted into the audio and 3D mesh vertex sequence synchronization discriminator, so that the audio and 3D mesh vertex sequence synchronization discriminator constructs matrices of the audio and the 3D mesh vertex sequences to determine the synchronization between the audio and the 3D mesh vertices. In this regard, the audio and 3D mesh vertex sequence synchronization discriminator may discriminate whether the 3D mesh vertex sequences are synchronized with the audio. By continuously inputting samples, the accuracy of the audio and 3D mesh vertex sequence synchronization discriminator is counted. When the accuracy reaches 50%, training of the audio and 3D mesh vertex sequence synchronization discriminator is completed. Similarly, the 3D mesh vertex sequence discriminator may discriminate the authenticity of the 3D mesh vertex sequences, and by continuously inputting samples, the accuracy of the 3D mesh vertex sequence discriminator is counted, when the accuracy reaches 50%, training of the 3D mesh vertex sequence discriminator is completed. The pseudo 3D mesh vertex sequence is split into a single pseudo 3D mesh vertex frame and inputted into the 3D mesh vertex frame discriminator (referred to as the frame discriminator), and the real 3D mesh vertex sequence is split into a single real 3D mesh vertex frame and inputted into the 3D mesh vertex frame discriminator. In this regard, the 3D mesh vertex frame discriminator may discriminate the authenticity of the 3D mesh vertices, and by continuously inputting samples, the accuracy of the 3D mesh vertex frame discriminator is counted, when the accuracy reaches 50%, training of the 3D mesh vertex frame discriminator is completed. When a loss value of the generator is less than a predetermined threshold, training of the generator is completed. Three types of discriminators and generators may be trained alternately, and when generative adversarial nets meet a training completion condition, the trained generator is obtained as a model for generating a 3D animation.

Figure 4:
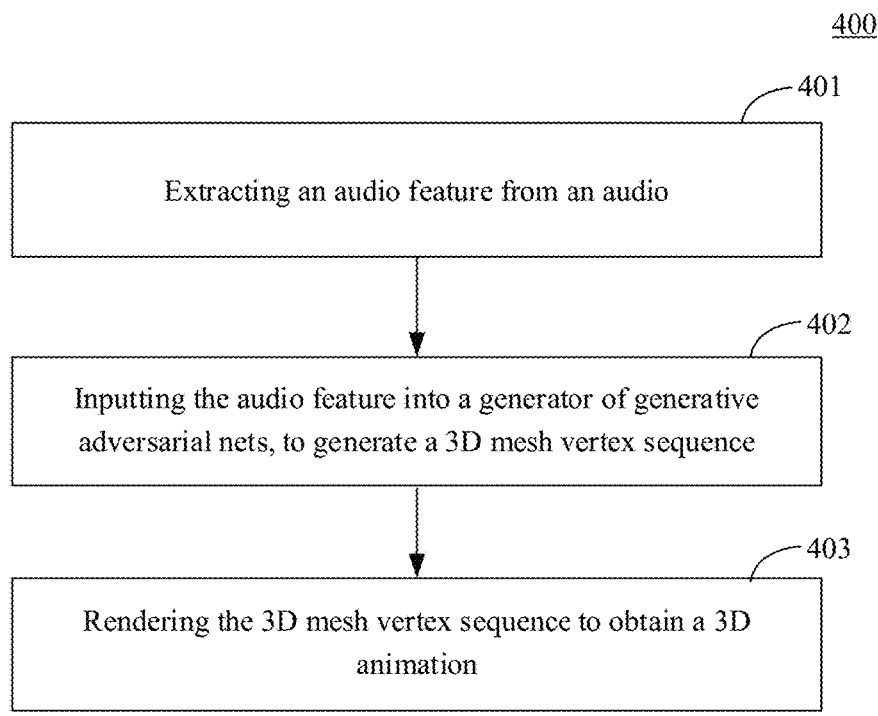
FIG. 4 is a flowchart of a method for generating a 3D animation according to an embodiment of the present disclosure.

With further reference to FIG. 4, a flow 400 of a method for generating a 3D animation according to an embodiment of the present disclosure is illustrated. The method for generating a 3D animation may include following steps.

Step 401, extracting an audio feature from an audio.

In the present embodiment, an executing body of the method for generating a 3D animation (for example, the server 105 shown in FIG. 1) may acquire the audio in a variety of methods. For example, the executing body may acquire an audio stored in a database server (for example, the database server 104 shown in FIG. 1) through a wired connection or a wireless connection. For example, the executing body may also receive an audio collected by a terminal (for example, the terminals 101 and 102 shown in FIG. 1) or other devices. The collected audio is inputted into RNN to extract the audio feature.

Step 402, inputting the audio feature into a generator of generative adversarial nets, to generate a 3D mesh vertex sequence.

In the present embodiment, the audio feature extracted in step 401 is inputted into the model for generating a 3D animation obtained by training in steps 201-208, to output the 3D mesh vertex sequence.

Step 403, rendering the 3D mesh vertex sequence to obtain a 3D animation.

In the present embodiment, a 3D rendering method commonly used in the existing technology may be used to render the 3D mesh vertex sequence to obtain the 3D animation, thereby completing drive of a virtual avatar.

It should be noted that the method for generating a 3D animation in the present embodiment may be used to test the model for generating a 3D animation generated in the foregoing embodiments. Furthermore, based on a test result, the model for generating a 3D animation may be continuously optimized. This method may also be an actual application method of the model for generating a 3D animation generated in the foregoing embodiments. Using the model for generating a 3D animation generated in the foregoing embodiments to generate 3D face animations is helpful to improve the authenticity and synchronization of the 3D face animations, and reduce facial expression jitter between frames.

Figure 5:
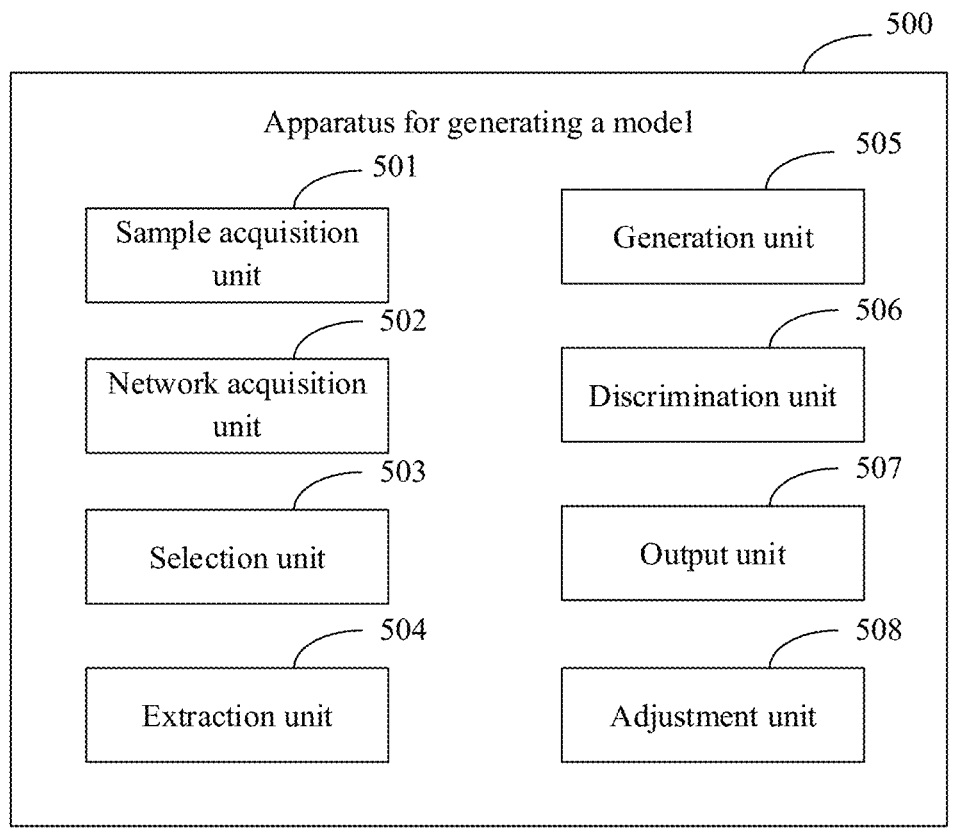
FIG. 5 is a schematic structural diagram of an apparatus for generating a model according to an embodiment of the present disclosure.

With further reference to FIG. 5, as an implementation of the method shown in the above FIG. 2, an embodiment of the present disclosure provides an apparatus for generating a model. An embodiment of the apparatus may correspond to an embodiment of the method shown in FIG. 2, and the apparatus may be applied to various electronic devices.

As shown in FIG. 5, an apparatus 500 for generating a model of the present embodiment may include: a sample acquisition unit 501, a network acquisition unit 502, a selection unit 503, an extraction unit 504, a generation unit 505, a discrimination unit 506 and an output unit 507. The sample acquisition unit 501 is configured to acquire a preset sample set, the sample set including at least one sample, and each of the at least one sample including a sample audio and a real 3D mesh vertex sequence. The network acquisition unit 502 is configured to acquire pre-established generative adversarial nets, the generative adversarial nets including a generator and a discriminator. The selection unit 503 is configured to select a sample from the sample set. The extraction unit 504 is configured to extract a sample audio feature from the sample audio of the sample. The generation unit 505 is configured to input the sample audio feature into the generator to obtain a pseudo 3D mesh vertex sequence of the sample. The discrimination unit 506 is configured to input the pseudo 3D mesh vertex sequence and the real 3D mesh vertex sequence of the sample into the discriminator to discriminate authenticity of 3D mesh vertices. The output unit 507 is configured to, in response to determining that the generative adversarial nets meet a training completion condition, obtain a trained generator as a model for generating a 3D animation.

In some alternative implementations of the present embodiment, the apparatus 500 further includes an adjustment unit 508, configured to: adjust a relevant parameter in the generative adversarial nets to make a loss value converge, in response to determining that the generative adversarial nets do not meet the training completion condition, and continue perform the above training steps based on the adjusted generative adversarial nets.

In some alternative implementations of the present embodiment, the discriminator includes at least one of: a 3D mesh vertex frame discriminator, a 3D mesh vertex sequence discriminator, or an audio and 3D mesh vertex sequence synchronization discriminator.

In some alternative implementations of the present embodiment, in response to determining that the discriminator includes the 3D mesh vertex frame discriminator, the discrimination unit 506 is further configured to: input each 3D mesh vertex frame in the pseudo 3D mesh vertex sequence and each 3D mesh vertex frame in the real 3D mesh vertex sequence into the 3D mesh vertex frame discriminator to discriminate authenticity of a single 3D mesh vertex frame.

In some alternative implementations of the present embodiment, in response to determining that the discriminator includes the audio and 3D mesh vertex sequence synchronization discriminator, the discrimination unit 506 is further configured to: form a first matrix by splicing the pseudo 3D mesh vertex sequence and the sample audio; form a second matrix by splicing the real 3D mesh vertex sequence and the sample audio; and input the first matrix and the second matrix into the audio and 3D mesh vertex sequence synchronization discriminator to discriminate whether the audio and the 3D mesh vertex sequences are synchronized.

In some alternative implementations of the present embodiment, in response to determining that the discriminator includes the 3D mesh vertex sequence discriminator, the discrimination unit 506 is further configured to: input the pseudo 3D mesh vertex sequence and the real 3D mesh vertex sequence into the 3D mesh vertex sequence discriminator to discriminate authenticity of the 3D mesh vertex sequences.

In some alternative implementations of the present embodiment, the generator includes an audio encoding module and an expression decoding module.

Figure 6:
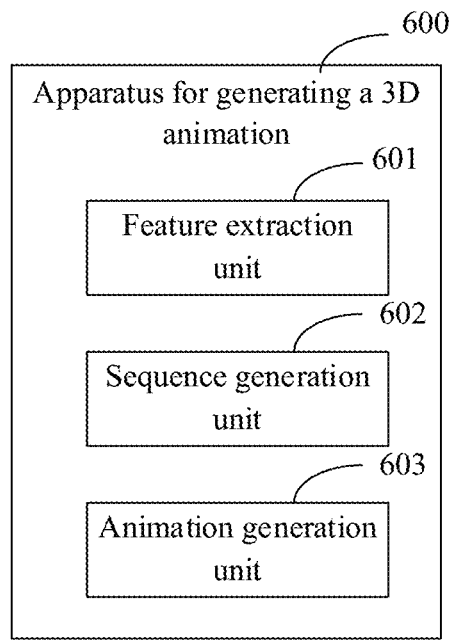
FIG. 6 is a schematic structural diagram of an apparatus for generating a 3D animation according to an embodiment of the present disclosure.

With further reference to FIG. 6, as an implementation of the method shown in the above FIG. 4, an embodiment of the present disclosure provides an apparatus for generating a 3D animation. An embodiment of the apparatus corresponds to an embodiment of the method shown in FIG. 4, and the apparatus may be applied to various electronic devices.

As shown in FIG. 6, an apparatus 600 for generating a 3D animation of the present embodiment may include: a feature extraction unit 601, a sequence generation unit 602 and an animation generation unit 603. The feature extraction unit 601 is configured to extract an audio feature from an audio. The sequence generation unit 602 is configured to input the audio feature into a generator of generative adversarial nets, to generate a 3D mesh vertex sequence. The animation generation unit 603 is configured to render the 3D mesh vertex sequence to obtain a 3D animation.

According to an embodiment of the present disclosure, the present disclosure also provides an electronic device and a readable storage medium.

Figure 7:
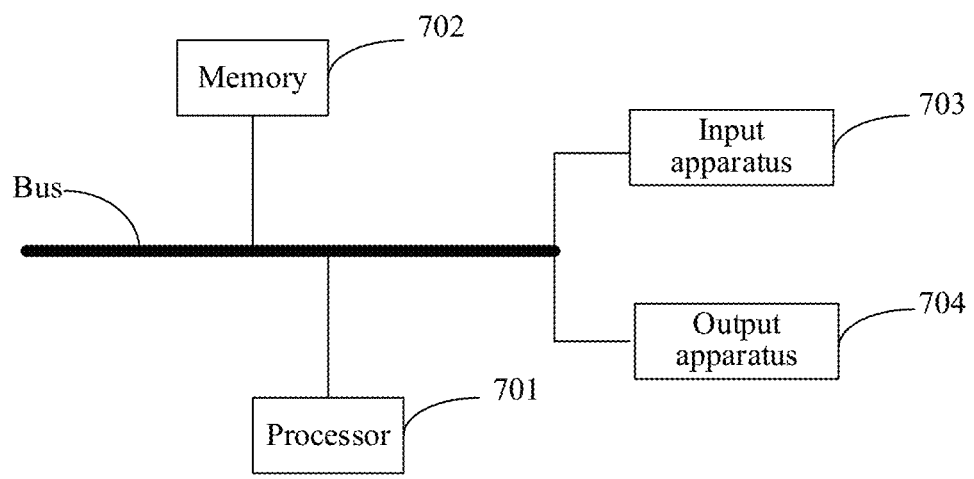
FIG. 7 is a block diagram of an electronic device for implementing the method for generating a model and the method for generating a 3D animation according to an embodiment of the present disclosure.

As shown in FIG. 7, is a block diagram of an electronic device for implementing the method for generating a model and the method for generating a 3D animation according to an embodiment of the present disclosure. The electronic device is intended to represent various forms of digital computers, such as laptop computers, desktop computers, workstations, personal digital assistants, servers, blade servers, mainframe computers, and other suitable computers. The electronic device may also represent various forms of mobile apparatuses, such as personal digital processors, cellular phones, smart phones, wearable devices, and other similar computing apparatuses. The components shown herein, their connections and relationships, and their functions are merely examples, and are not intended to limit the implementation of the present disclosure described and/or claimed herein.

As shown in FIG. 7, the electronic device includes: one or more processors 701, a memory 702, and interfaces for connecting various components, including high-speed interfaces and low-speed interfaces. The various components are connected to each other using different buses, and may be installed on a common motherboard or in other methods as needed. The processor may process instructions executed within the electronic device, including instructions stored in or on the memory to display graphic information of GUI on an external input/output apparatus (such as a display device coupled to the interface). In other embodiments, a plurality of processors and/or a plurality of buses may be used together with a plurality of memories if desired. Similarly, a plurality of electronic devices may be connected, and the devices provide some necessary operations (for example, as a server array, a set of blade servers, or a multi-processor system). In FIG. 7, one processor 701 is used as an example.

The memory 702 is a non-transitory computer readable storage medium provided by embodiments of the present disclosure. The memory stores instructions executable by at least one processor, so that the at least one processor performs the method for generating a model and the method for generating a 3D animation provided by embodiments of the present disclosure. The non-transitory computer readable storage medium of embodiments of the present disclosure stores computer instructions for causing a computer to perform the method for generating a model and the method for generating a 3D animation provided by embodiments of the present disclosure.

The memory 702, as a non-transitory computer readable storage medium, may be used to store non-transitory software programs, non-transitory computer executable programs and modules, such as program instructions/modules corresponding to the method for generating a model and the method for generating a 3D animation in embodiments of the present disclosure (for example, the sample acquisition unit 501, the network acquisition unit 502, the selection unit 503, the extraction unit 504, the generation unit 505, the discrimination unit 506, the output unit 507 and the adjustment unit 508 as shown in FIG. 5). The processor 701 executes the non-transitory software programs, instructions, and modules stored in the memory 702 to execute various functional applications and data processing of the server, that is, to implement the method for generating a model and the method for generating a 3D animation in the foregoing method embodiments.

The memory 702 may include a storage program area and a storage data area, where the storage program area may store an operating system and an application program required by at least one function; and the storage data area may store data created by the use of the electronic device of generating a model and for generating a 3D animation. In addition, the memory 702 may include a high-speed random access memory, and may also include a non-transitory memory, such as at least one magnetic disk storage device, a flash memory device, or other non-transitory solid-state storage devices. In some embodiments, the memory 702 may optionally include memories remotely provided with respect to the processor 701, and these remote memories may be connected to the electronic device of generating a model and for generating a 3D animation through a network. Examples of the above network include but are not limited to the Internet, intranet, local area network, mobile communication network, and combinations thereof.

The electronic device of the method for generating a model and the method for generating a 3D animation may further include: an input apparatus 703 and an output apparatus 704. The processor 701, the memory 702, the input apparatus 703, and the output apparatus 704 may be connected through a bus or in other methods. In FIG. 7, connection through the bus is used as an example.

The input apparatus 703 may receive input digital or character information, and generate key signal inputs related to user settings and function control of the electronic device of generating a model and for generating a 3D animation, such as touch screen, keypad, mouse, trackpad, touchpad, pointing stick, one or more mouse buttons, trackball, joystick and other input apparatuses. The output apparatus 704 may include a display device, an auxiliary lighting apparatus (for example, LED), a tactile feedback apparatus (for example, a vibration motor), and the like. The display device may include, but is not limited to, a liquid crystal display (LCD), a light emitting diode (LED) display, and a plasma display. In some embodiments, the display device may be a touch screen.

Various implementations of the systems and techniques described herein may be implemented in a digital electronic circuit system, an integrated circuit system, an application specific integrated circuit (ASIC), computer hardware, firmware, software, and/or combinations thereof. These various implementations may include the implementation in one or more computer programs. The one or more computer programs may be executed and/or interpreted on a programmable system including at least one programmable processor, and the programmable processor may be a dedicated or general-purpose programmable processor, may receive data and instructions from a storage system, at least one input apparatus and at least one output apparatus, and transmit the data and the instructions to the storage system, the at least one input apparatus and the at least one output apparatus.

These computing programs, also referred to as programs, software, software applications or codes, include a machine instruction of the programmable processor, and may be implemented using a high-level procedural and/or an object-oriented programming language, and/or an assembly/machine language. As used herein, the terms "machine readable medium" and "computer readable medium" refer to any computer program product, device and/or apparatus (e.g., a magnetic disk, an optical disk, a storage device and a programmable logic device (PLD)) used to provide a machine instruction and/or data to the programmable processor, and include a machine readable medium that receives the machine instruction as a machine readable signal. The term "machine readable signal" refers to any signal used to provide the machine instruction and/or data to the programmable processor.

To provide an interaction with a user, the systems and techniques described here may be implemented on a computer having a display apparatus (e.g., a cathode ray tube (CRT)) or an LCD monitor) for displaying information to the user, and a keyboard and a pointing apparatus (e.g., a mouse or a track ball) by which the user may provide the input to the computer. Other kinds of apparatuses may also be used to provide the interaction with the user. For example, a feedback provided to the user may be any form of sensory feedback (e.g., a visual feedback, an auditory feedback, or a tactile feedback); and an input from the user may be received in any form, including acoustic, speech, or tactile input.

The systems and techniques described here may be implemented in a computing system (e.g., as a data server) that includes a backend part, implemented in a computing system (e.g., an application server) that includes a middleware part, implemented in a computing system (e.g., a user computer having a graphical user interface or a Web browser through which the user may interact with an implementation of the systems and techniques described here) that includes a frontend part, or implemented in a computing system that includes any combination of the backend part, the middleware part or the frontend part. The parts of the system may be interconnected by any form or medium of digital data communication (e.g., a communication network). Examples of the communication network include a local area network (LAN), a wide area network (WAN) and Internet.

The computer system may include a client and a server. The client and the server are generally far from each other and generally interact through the communication network. The relationship between the client and the server is generated by computer programs that run on the corresponding computer and have a client-server relationship with each other. The server may be a server of a distributed system or a server combined with a blockchain. The server may also be a cloud server, or a smart cloud computing server or smart cloud host combined with artificial intelligence technology.

According to the technical solutions of embodiments of the present disclosure, there is no need to make additional modifications to the generator, nor to increase the number of generator parameters and calculation amount, and predicted time consuming may not increase, but the authenticity, continuity, stability and synchronization of facial expressions greatly improve. The technical solutions of embodiments of the present disclosure strongly support a variety of business and product scenarios such as audio stream-driven virtual avatar live broadcast and video production, and have very high application value.

It should be understood that the various forms of processes shown above may be used to resort, add or delete steps. For example, the steps described in embodiments of the present disclosure may be performed in parallel, sequentially, or in a different order. As long as the desired result of the technical solution disclosed in embodiments of the present disclosure can be achieved, no limitation is made herein.

Embodiments do not constitute a limitation to the scope of protection of the present disclosure. It should be appreciated by those skilled in the art that various modifications, combinations, sub-combinations and substitutions may be made depending on design requirements and other factors. Any modifications, equivalents and replacements, and improvements falling within the spirit and the principle of embodiments of the present disclosure should be included within the scope of protection of the present disclosure.

What is claimed is:

1. A method for generating a model, the method comprising:
   acquiring a preset sample set, the sample set comprising at least one sample, and each of the at least one sample comprising a sample audio and a real 3D mesh vertex sequence;
   acquiring pre-established generative adversarial nets, the generative adversarial nets comprising a generator and a discriminator, wherein the discriminator comprises at least one of: a 3D mesh vertex frame discriminator, a 3D mesh vertex sequence discriminator, or an audio and 3D mesh vertex sequence synchronization discriminator; and
   performing training steps as follows:
      selecting a sample from the sample set;
      extracting a sample audio feature from the sample audio of the sample;
      inputting the sample audio feature into the generator to obtain a pseudo 3D mesh vertex sequence of the sample;
      forming a first matrix by splicing the pseudo 3D mesh vertex sequence and the sample audio;
      forming a second matrix by splicing the real 3D mesh vertex sequence and the sample audio;
      inputting the first matrix and the second matrix into the audio and 3D mesh vertex sequence synchronization discriminator to discriminate whether the audio and 3D mesh vertex sequences including the pseudo 3D mesh vertex sequence and the real 3D mesh vertex sequences are synchronized; and
      in response to determining that the generative adversarial nets meet a training completion condition, obtaining a trained generator as a model for generating a 3D animation.

2. The method according to claim 1, wherein the method further comprises:
   adjusting a relevant parameter in the generative adversarial nets to make a loss value converge, in response to determining that the generative adversarial nets do not meet the training completion condition, and continue performing the training steps based on the adjusted generative adversarial nets.

3. The method according to claim 1, wherein the discriminator comprises at least one of:
   a 3D mesh vertex frame discriminator, or a 3D mesh vertex sequence discriminator.

4. The method according to claim 3, wherein, in response to determining that the discriminator comprises the 3D mesh vertex frame discriminator, the inputting the pseudo 3D mesh vertex sequence and the real 3D mesh vertex sequence of the sample into the discriminator to discriminate authenticity of 3D mesh vertices, comprises:
   inputting each 3D mesh vertex frame in the pseudo 3D mesh vertex sequence and each 3D mesh vertex frame in the real 3D mesh vertex sequence into the 3D mesh vertex frame discriminator to discriminate authenticity of a single 3D mesh vertex frame.

5. The method according to claim 3, wherein, in response to determining that the discriminator comprises the 3D mesh vertex sequence discriminator, the inputting the pseudo 3D mesh vertex sequence and the real 3D mesh vertex sequence of the sample into the discriminator to discriminate authenticity of 3D mesh vertices, comprises:
   inputting the pseudo 3D mesh vertex sequence and the real 3D mesh vertex sequence into the 3D mesh vertex sequence discriminator to discriminate authenticity of the pseudo 3D mesh vertex sequence and the real 3D mesh vertex sequence.

6. The method according to claim 1, wherein the generator comprises an audio encoding module and an expression decoding module.

7. A method for generating a 3D animation, the method comprising:
   extracting an audio feature from an audio;
   inputting the audio feature into a generator of generative adversarial nets generated in the method according to claim 1, to generate a 3D mesh vertex sequence; and
   rendering the 3D mesh vertex sequence to obtain a 3D animation.

8. An electronic device, comprising:
   at least one processor; and
   a memory, communicatively connected with the at least one processor;
   the memory storing instructions executable by the at least one processor, and the instructions, when executed by the at least one processor, causing the at least one processor to perform operations, the operations comprising:
      extracting an audio feature from an audio;
      inputting the audio feature into a generator of generative adversarial nets generated in the method according to claim 1, to generate a 3D mesh vertex sequence; and
      rendering the 3D mesh vertex sequence to obtain a 3D animation.

9. A non-transitory computer readable storage medium, storing computer instructions, the computer instructions being used to cause a computer to perform operations, the operations comprising:
   extracting an audio feature from an audio;
   inputting the audio feature into a generator of generative adversarial nets generated in the method according to claim 1, to generate a 3D mesh vertex sequence; and
   rendering the 3D mesh vertex sequence to obtain a 3D animation.

10. An electronic device, comprising:
    at least one processor; and
    a memory, communicatively connected with the at least one processor;
    the memory storing instructions executable by the at least one processor, and the instructions, when executed by the at least one processor, causing the at least one processor to perform operations, the operations comprising:

acquiring a preset sample set, the sample set comprising at least one sample, and each of the at least one sample comprising a sample audio and a real 3D mesh vertex sequence;

acquiring pre-established generative adversarial nets, the generative adversarial nets comprising a generator and a discriminator, wherein the discriminator comprises at least one of: a 3D mesh vertex frame discriminator, a 3D mesh vertex sequence discriminator, or an audio and 3D mesh vertex sequence synchronization discriminator; and performing training steps as follows:
selecting a sample from the sample set;
extracting a sample audio feature from the sample audio of the sample;
inputting the sample audio feature into the generator to obtain a pseudo 3D mesh vertex sequence of the sample;
forming a first matrix by splicing the pseudo 3D mesh vertex sequence and the sample audio;
forming a second matrix by splicing the real 3D mesh vertex sequence and the sample audio;
inputting the first matrix and the second matrix into the audio and 3D mesh vertex sequence synchronization discriminator to discriminate whether the audio and 3D mesh vertex sequences including the pseudo 3D mesh vertex sequence and the real 3D mesh vertex sequence are synchronized; and
in response to determining that the generative adversarial nets meet a training completion condition, obtaining a trained generator as a model for generating a 3D animation.

11. The electronic device according to claim 10, wherein the operations further comprise:
adjusting a relevant parameter in the generative adversarial nets to make a loss value converge, in response to determining that the generative adversarial nets do not meet the training completion condition, and continue performing the training steps based on the adjusted generative adversarial nets.

12. The electronic device according to claim 10, wherein the discriminator comprises at least one of: a 3D mesh vertex frame discriminator, or a 3D mesh vertex sequence discriminator.

13. The electronic device according to claim 12, wherein, in response to determining that the discriminator comprises the 3D mesh vertex frame discriminator, the inputting the pseudo 3D mesh vertex sequence and the real 3D mesh vertex sequence of the sample into the discriminator to discriminate authenticity of 3D mesh vertices, comprises:
inputting each 3D mesh vertex frame in the pseudo 3D mesh vertex sequence and each 3D mesh vertex frame in the real 3D mesh vertex sequence into the 3D mesh vertex frame discriminator to discriminate authenticity of a single 3D mesh vertex frame.

14. The electronic device according to claim 12, wherein, in response to determining that the discriminator comprises the 3D mesh vertex sequence discriminator, the inputting the pseudo 3D mesh vertex sequence and the real 3D mesh vertex sequence of the sample into the discriminator to discriminate authenticity of 3D mesh vertices, comprises:
inputting the pseudo 3D mesh vertex sequence and the real 3D mesh vertex sequence into the 3D mesh vertex sequence discriminator to discriminate authenticity of the pseudo 3D mesh vertex sequence and the real 3D mesh vertex sequence.

15. The electronic device according to claim 9, wherein the generator comprises an audio encoding module and an expression decoding module.

16. A non-transitory computer readable storage medium, storing computer instructions, the computer instructions being used to cause a computer to perform operations, the operations comprising:
acquiring a preset sample set, the sample set comprising at least one sample, and each of the at least one sample comprising a sample audio and a real 3D mesh vertex sequence;
acquiring pre-established generative adversarial nets, the generative adversarial nets comprising a generator and a discriminator, wherein the discriminator comprises at least one of: a 3D mesh vertex frame discriminator, a 3D mesh vertex sequence discriminator, or an audio and 3D mesh vertex sequence synchronization discriminator; and
performing training steps as follows:
selecting a sample from the sample set;
extracting a sample audio feature from the sample audio of the sample;
inputting the sample audio feature into the generator to obtain a pseudo 3D mesh vertex sequence of the sample;
forming a first matrix by splicing the pseudo 3D mesh vertex sequence and the sample audio;
forming a second matrix by splicing the real 3D mesh vertex sequence and the sample audio;
inputting the first matrix and the second matrix into the audio and 3D mesh vertex sequence synchronization discriminator to discriminate whether the audio and 3D mesh vertex sequences including the pseudo 3D mesh vertex sequence and the real 3D mesh vertex sequence are synchronized; and
in response to determining that the generative adversarial nets meet a training completion condition, obtaining a trained generator as a model for generating a 3D animation.

* * * * *